United States Patent
Gonzalez et al.

(10) Patent No.: US 10,408,192 B2
(45) Date of Patent: Sep. 10, 2019

(54) LIFT INFLUENCING DEVICE FOR A ROTOR BLADE OF A WIND TURBINE

(71) Applicant: Siemens Gamesa Renewable Energy A/S, Brande (DK)

(72) Inventors: Alejandro Gomez Gonzalez, Aarhus (DK); Jesper Monrad Laursen, Silkeborg (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 231 days.

(21) Appl. No.: 14/806,913

(22) Filed: Jul. 23, 2015

(65) Prior Publication Data

US 2016/0084223 A1    Mar. 24, 2016

(30) Foreign Application Priority Data

Sep. 19, 2014    (EP) .................................... 14185540

(51) Int. Cl.
*F03D 7/02*    (2006.01)
*F03D 1/06*    (2006.01)

(52) U.S. Cl.
CPC ........... *F03D 7/0232* (2013.01); *F03D 1/065* (2013.01); *F03D 1/0633* (2013.01);
(Continued)

(58) Field of Classification Search
CPC ...... F03D 1/0633; F03D 1/641; F03D 7/0232; F03D 1/065; F03D 1/0675; F03D 1/0683;
(Continued)

(56) References Cited

U.S. PATENT DOCUMENTS 2,772,058 A * 11/1956 Grant ...................... B64C 21/02
                                                      244/216
4,015,787 A *  4/1977 Maieli ....................... B64C 9/20
                                                      244/113
(Continued)

FOREIGN PATENT DOCUMENTS

CA        2634427 A1    11/2008
CA        2811574 A1    10/2013
(Continued)

OTHER PUBLICATIONS

European Search Report for EP Application No. 14185540.3, dated Apr. 8, 2015.

(Continued)

*Primary Examiner* — Jason D Shanske
*Assistant Examiner* — Sang K Kim
(74) *Attorney, Agent, or Firm* — Schmeiser, Olsen & Watts, LLP

(57) ABSTRACT

A rotor blade of a wind turbine, wherein the rotor blade includes a lift modifying device, is provided. The lift modifying device is a part of the trailing edge section of the rotor blade. The lift modifying device is configured such that, at a predetermined loading of the trailing edge section, an air channel opens up a flow path from the pressure side to the suction side and vice versa in the trailing edge section. As a consequence, airflow flowing from the leading edge section of the rotor blade to the trailing edge section is at least partly deflected by the open air channel, which results in a modification of the lift of the rotor blade. A method to modify the lift of a rotor blade of a wind turbine is also provided.

12 Claims, 7 Drawing Sheets

(52) U.S. Cl.
CPC ......... *F03D 1/0641* (2013.01); *F03D 1/0675* (2013.01); *F05B 2240/31* (2013.01); *Y02E 10/721* (2013.01)

(58) Field of Classification Search
CPC . B64C 21/02; B64C 2230/06; B64C 2230/20; F05B 2240/31
See application file for complete search history.

(56) References Cited

U.S. PATENT DOCUMENTS

| | | | |
|---|---|---|---|
| 5,527,151 A * | 6/1996 | Coleman | B64C 9/00 244/215 |
| 5,527,152 A * | 6/1996 | Coleman | F03D 7/0252 244/130 |
| 5,570,859 A * | 11/1996 | Quandt | B64C 9/18 244/113 |
| 7,204,674 B2 * | 4/2007 | Wobben | F03D 1/0641 416/1 |
| 7,922,450 B2 | 4/2011 | Narasimalu | |
| 8,506,248 B2 | 8/2013 | Wilson | |
| 8,876,044 B2 * | 11/2014 | Cazals | B64C 23/065 244/87 |
| 9,016,638 B2 * | 4/2015 | Dahl | B64C 9/20 244/113 |
| 2010/0143151 A1 | 6/2010 | Kinzie et al. | |
| 2011/0103950 A1 | 5/2011 | Pesetsky et al. | |
| 2011/0142629 A1 | 6/2011 | Pesetsky | |
| 2011/0255972 A1 * | 10/2011 | Lew | F01D 5/141 416/111 |
| 2014/0140846 A1 * | 5/2014 | Birkestrand | F03B 17/061 416/10 |
| 2014/0193256 A1 * | 7/2014 | Matsuda | F03D 1/0675 416/3 |
| 2014/0286784 A1 | 9/2014 | Singh | |
| 2015/0030449 A1 * | 1/2015 | Betran Palomas | F03D 7/0224 416/1 |

FOREIGN PATENT DOCUMENTS

| | | | | |
|---|---|---|---|---|
| DK | 9500009 U3 | 4/1996 | | |
| EP | 2004989 A1 | 12/2008 | | |
| EP | 2233735 A2 | 9/2010 | | |
| EP | 2253836 A1 | 11/2010 | | |
| EP | 2320076 A2 | 5/2011 | | |
| EP | 2549097 A1 * | 1/2013 | ............ | F03D 7/022 |
| FR | 2115468 A2 | 7/1972 | | |
| GB | 329783 A | 5/1930 | | |
| JP | 2014092141 A | 5/2014 | | |
| WO | WO 2010043645 A2 | 4/2010 | | |
| WO | WO 2011064214 A2 | 6/2011 | | |
| WO | WO 2013076009 A1 | 5/2013 | | |

OTHER PUBLICATIONS

Decision on Grant for European Application No. 14 185 540.3, dated May 23, 2017.

* cited by examiner

LIFT INFLUENCING DEVICE FOR A ROTOR BLADE OF A WIND TURBINE

CROSS-REFERENCE TO RELATED APPLICATIONS

This application claims priority to European Application No. 14185540.3 having a filing date of Sep. 19, 2014, the entire contents of which are hereby incorporated by reference.

FIELD OF TECHNOLOGY

The following relates to a way of changing the aerodynamic characteristics of a rotor blade. In particular, embodiments of the invention relate to a rotor blade of a wind turbine, wherein the rotor blade comprises a lift modifying device, and to a method of modifying the lift of a rotor blade of a wind turbine.

BACKGROUND

A rotor blade of a wind turbine typically comprises a root section, which is arranged and prepared for being attached to a hub of the wind turbine, and an airfoil section, which is arranged and prepared for generating lift. Regarding the airfoil section, a pressure side, a suction side, a leading edge and a trailing edge can be attributed to it.

At every spanwise position of the rotor blade, a chord line, which is a straight line connecting the trailing edge and the leading edge, can be determined. The angle between the chord line and the direction of the airflow that is impinging on the rotor blade at the leading edge is referred to as the angle of attack. If the actual angle of attack equals a pre-determined design angle of attack, an optimum power can be extracted from the airflow that is impinging on the rotor blade. The rotor blade is designed such that for normal operating conditions of the rotor blade the airfoil shape and the structural characteristics are optimal.

However, various circumstances can lead to deviations of the actual angle of attack with regard to the design angle of attack. Reasons for these deviations are, for instance: turbulence variations in the airflow, thus the wind speed suddenly increases or decreases; gusts where the wind speed suddenly changes direction; changes in the angle of attack due to torsion of the blade; changes of the angle of attack due to wind shear and veer; operation of the wind turbine with a yaw error. When the angle of attack at which the rotor blade operates deviates from the optimal angle of attack, i.e. the design angle of attack, the lift which is generated by the rotor blade may deviate from its optimal value.

This deviation can, generally speaking, have two effects on the wind turbine:

First, there may occur a non-optimal power extraction due to either high loading which may cause a high blocking of the airflow by the wind turbine, or due to low loading and therefore resulting in a low torque.

Second, there may occur a higher loading of the components as the components have been designed to due to, for instance, a simultaneous extreme increase in wind speed and increase in the angle of attack.

Both effects are in principle unwanted effects as they reduce the energy output of the wind turbine, reduce the life time of the wind turbine, and/or cause an overly conservative design of the main components of the wind turbine.

Thus, it is desirable to optimize the lift that is generated by the rotor blade.

Several solutions are known for increasing or decreasing the lift of a rotor blade.

A first option is the provision of Gurney flaps which are typically add-ons that are attached at the trailing edge at the pressure side of the rotor blade. An example of such a modification, which may also be integrated in the design of the airfoil such that the attachment of a separate piece is not necessary, is given in the European patent application EP 2 004 989 A1.

A second option for influencing the lift of the rotor blade is the provision of flaps that are connected to or integrated into the trailing edge section of the rotor blade. Examples of such flaps are given in the Danish utility model DK 95 00009 U3. In this document, it is proposed to add a rigid or flexible flap at the pressure side at a trailing edge section behind the trailing edge or upstream of the trailing edge.

Yet another option to influence the lift of the rotor blade is the provision of slats or other add-ons that are mounted to the leading edge section of the rotor blade. The concept and some specific embodiments of this idea is for example disclosed in the European patent application EP 2 078 852 A2.

These aerodynamic add-ons may be externally actuated. In other words, there is a mechanism by which these aerodynamic devices can be actuated externally. Actuation may be implemented by mechanical mechanisms, piezoelectric mechanisms or hydraulic mechanisms. An example of a piezo-actuated lift modifying trailing edge section of a rotor blade is, for instance, disclosed in the European patent application EP 2 233 735 A2.

The conventional methods and devices for influencing the lift of the rotor blade, in particular for optimizing the lift of the rotor blade in order to maximize the energy output that the wind turbine can generate, have, however, several drawbacks.

On the one hand, there may be the need of external actuator mechanisms which may be costly to implement and expensive to service.

Additionally, it may be difficult to locally influence the lift of the rotor blade. In this context it is important to understand that it may occur that at a first section of the rotor blade the actual angle of attack approaches the design angle of attack well, while at a different, second section at the rotor blade the design angle and the actual angle of attacks differ. In other words, it may be beneficial to be able to locally influence the lift if needed. Another disadvantage of existing lift influencing devices is that typically they are able to either increase the lift or decrease the lift.

It is thus desirable to provide alternative means to influence the lift characteristics of a rotor blade, in particular of an airfoil section of the rotor blade. Preferably, these alternative means overcome at least some of the mentioned drawbacks of existing lift influencing devices.

SUMMARY

According to embodiments of the invention, there is provided a rotor blade of a wind turbine with a lift modifying device. The rotor blade comprises a leading edge section with a leading edge, and a trailing edge section with a trailing edge. The lift modifying device is a part of the trailing edge section. The lift modifying device is configured such that, at a predetermined loading of the trailing edge section, an air channel opens up a flow path from the pressure side to the suction side and vice versa in the trailing edge section. Thus, air flow flowing from the leading edge section to the trailing edge section is at least partly deflected by the open air channel. This results in a modification of the lift of the rotor blade.

The rotor blade comprises an airfoil section. Due to the aerodynamic design, i.e. the aerodynamic shape, of the airfoil section, the rotor blade is able to generate a lift. The lift translates into a force that is substantially perpendicular to the chordal plane of the rotor blade and which is directing away of the suction side, i.e. opposite to the pressure side. The lift modifying device is integrated into the trailing edge section.

The trailing edge section surrounds the trailing edge. The trailing edge section has a chordwise extension of less than 20 percent of the chord length. In other words, the trailing edge section extends at most from 80 percent of the chord length until 100 percent of the chord length, as measured from the leading edge. The chord line, which length is referred to as the chord length, is defined as the straight line connecting the leading edge with the trailing edge and being substantially perpendicular to the span of the rotor blade.

Note that in the case that the trailing edge section comprises an extension part that is separate from the remaining trailing edge section, the trailing edge has to be understood as being the section of the extension part that is furthest downstream. This even applies to the case that the extension part and the remaining trailing edge section are separated by a gap. Also then the trailing edge has not to be understood as the section of the remaining trailing edge section that is furthest downstream, but as the section of the extension part that is furthest downstream.

At no loading of the trailing edge section or at a loading which is smaller than the predetermined loading the lift modifying device is in a closed status. This means that substantially no airflow flows from the pressure side to the suction side or vice versa via the lift modifying device. Thus, the airflow that is flowing from the leading edge to the trailing edge section flows along the lift modifying device at two separate airflows, one at the pressure side and one at the suction side. If the predetermined loading is reached or exceeded the lift modifying device opens up an air channel such that the airflow is at least partly deflected by the open air channel. Consequently, the lift modifying device is projecting into the airflow and at least a small flow from the pressure side to the suction side or vice versa is achieved.

The predetermined loading has to be understood as a certain loading or pressure or force that is acting on the trailing edge section. The predetermined loading may, for instance, be understood as a certain threshold value. If the threshold value is reached or exceeded, the open air channel opens up.

Note that the opening up of the air channel may occur actively or passively.

An active mechanism is referred to as an external mechanism such as a mechanical, hydraulic or piezoelectric mechanism or the like which has to be actuated in order to carry out the configurational change of the lift modifying device at the predetermined loading.

A passive mechanism is referred to as a concept where the choice of the material and the design of the lift modifying device allows a reversible change of its configuration depending on the load on the lift modifying device.

Examples of how the lift modifying device may be configured concretely will be described in more detail below. Generally speaking, the choice of material and the way how the lift modifying device is connected to the remaining part of the rotor blade are important aspects of ensuring that the air channel opens up at the predetermined loading and not at loadings which are smaller or larger than the predetermined loading.

As an example, the lift modifying device may be made of an elastomeric material with a given range of the elastic modulus, such as e.g. rubber. Other examples of suitable materials are thin plastic layers or thin, ductile metallic layers. In general, a metallic material with a sufficiently high ductility and a coating which provides for electric isolation, may be well suited for the lift modifying device.

The loading of the whole rotor blade plays a role for activation of the lift modifying device. However, it is specifically the loading of the trailing edge section that is crucial and critical for the fact of opening or closing the air channel at the trailing edge section.

The trailing edge section may also be denoted as the aft portion of the rotor blade.

By careful and suitable design of the lift modifying device a customized lift curve can be generated by easy and reliable means. Thus, energy extraction by the wind turbine can be improved and/or load on main components of the wind turbine can be alleviated.

Specifically, some advantages of this lift modifying device being integrated in a rotor blade of a wind turbine are named in the following:

First, a decrease of the level of loading of the rotor blade at low wind speeds is possible. This is particularly advantageous for rotor blades with a backward sweep.

Second, the loading of the rotor blade can be changed in order to avoid variations of the loading due to shear forces.

Third, a decrease of the loading for unfavorable combinations of a relative inflow wind speed and angle of attack of the airfoil section which otherwise would cause considerably high loads.

Fourth, an upgrade of the performance, in particular the energy production capability of the wind turbine at specific sites, is possible.

Fifth, the performance of the rotor blade, in particular the airfoil section of the rotor blade, as a function of the wind speed can be upgraded and improved.

In summary, embodiments of the invention are able to provide a rotor blade with a customized lift curve.

In a first embodiment of the invention, the trailing edge section comprises an extension part which is separate from the remaining trailing edge section. The extension part is attached to the remaining trailing edge section, and the lift modifying device is a part of the extension part.

An advantage of integrating the lift modifying device into a separate part, i.e. the extension part, is that manufacturing of the main part of the rotor blade including the remaining trailing edge section but excluding the extension part does not require fundamental changes in the manufacturing process of the rotor blade.

Another advantage is that a retrofit of an existing rotor blade is easily feasible. If, for example, the existing rotor blade already comprises an existing extension part, which however does not comprise any lift modifying device, then the existing extension part can be substituted by a new extension part, which comprises at least one lift modifying device.

According to another embodiment of the invention, the lift modifying device is built as one single piece.

This has the advantage that a connection between the two parts, i.e. between the extension part and the remaining trailing edge section, is not needed. This reduces the risk of failure in the rotor blade and reduces or completely prevents a servicing of the extension part and the connection of the extension part with the remaining trailing edge section.

In another embodiment of the invention, the rotor blade comprises a plurality of lift modifying devices, which are arranged in spanwise direction on the trailing edge section. Thus, the lift of the rotor blade can be modified locally with regard to a spanwise position along the rotor blade.

The possibility of locally modifying the lift along the span of the rotor blade is a significant advantage compared to existing lift modifying systems. As the dimensions of the lift modifying devices can be chosen in a wide range between a few centimeters and several meters, there is a considerable variety of modifying the lift of the rotor blade on a local, spanwise basis. It may, for example, be advantageous to place the lift modifying devices in the outer part, i.e. the outboard section, of the rotor blade. The outer part refers to the section of the rotor blade which is, in spanwise relation, adjacent to the tip of the rotor blade. The outer part may for example be understood as the last third of the span, as measured from the root of the rotor blade.

Another aspect of the configuration of the lift modifying device is the direction to which the lift modifying device projects when the air channel is opened. Concretely, the lift modifying device may open towards the pressure side of the rotor blade or towards the suction side of the rotor blade. In other words, if a force from the suction side is applied on the trailing edge section the lift modifying device opens up towards the pressure side. This scenario is referred to as the first predetermined loading. Likewise, the second predetermined loading scenario is referred to as the case where a force from the pressure side is applied on the trailing edge section, thus opening up the lift modifying device towards the suction side.

Note that it is possible that the lift modifying device is designed such that it can project towards the suction side in the first predetermined loading scenario, i.e. if a force from the suction side is applied on the trailing edge section and at another scenario, i.e. the second predetermined loading, the lift modifying device projects towards the suction side. Thus, one single lift modifying device may influence the airflow in either the one or the other side depending on the loading, in particular depending on the direction of the force which translates into the loading.

However, it may be desired that the lift modifying device is exclusively able to open up towards one specific side. In this case, the lift modifying device may comprise a mechanism which prevents that the lift modifying device opens up towards the pressure side, thus only allowing that the lift modifying device opens up towards the suction side. The same concept can be implemented vice versa, i.e. preventing an opening up of the lift modifying device towards the suction side and only allowing an opening up of the lift modifying device towards the pressure side.

This mechanism of selectively blocking the opening of the air channel towards either the pressure side or the suction side may for example be realized by a rim of the lift modifying device which at least partly overlaps with a rim of the air channel in the closed state of the air channel.

In other words, a protrusion or a prominence in the rim of the air channel may be implemented which prevents that the lift modifying device moves into a predetermined direction.

In general, a leading edge device portion and a trailing edge device portion can be attributed to the lift modifying device. The leading edge device portion is defined as facing towards the leading edge section of the rotor blade. Likewise, the trailing edge device portion is facing towards the trailing edge. Thus, the trailing edge device portion is opposite to the leading edge device portion.

In another advantageous embodiment of the invention, the lift modifying device opens up at either the leading edge device portion or the trailing edge device portion.

In other words, the design of the lift modifying device can be chosen such that it is connected to the remaining trailing edge section by specifically the leading edge device portion or the trailing edge device portion. As a consequence, when the lift modifying device opens up the air channel one part of the lift modifying device is still in close contact to the rim of the air channel while the opposite end of the lift modifying device now projects into the airflow and in particular induces a fraction of the airflow to flow through the air channel.

This connection of the lift modifying device with the remaining trailing edge section can for example be realized by a mechanical hinge which may in particular comprise a torsional spring.

This has the advantage that the lift modifying device can be designed as a rigid and stiff component which is hinged on one side to the trailing edge section by a mechanical hinge. Torsional springs are advantageous to be used as they are readily available; they are proven and able to withstand harsh conditions over a long period of time, in particular over the life time of the rotor blade.

Another possibility to design the lift modifying device, in particular to realize the mechanism of opening up the air channel, is that the lift modifying device is firmly attached to the trailing edge section, but that the lift modifying device is flexible such that it can elastically deflect for passively opening up the air channel at a predetermined loading of the trailing edge section.

This has the advantage that no mechanical parts such as springs and the like are needed. Flexible flaps are known to be implemented into rotor blades from flexible serrated flaps, for instance, which may be attached to the trailing edge of the rotor blade.

Note that depending on the choice where the lift modifying device is attached to the remaining trailing edge section, in particular if the lift modifying device is attached at its leading edge device portion or at its trailing edge device portion, the airflow is deflected differently. In the example of a first predetermined loading, i.e. in the case that a force from the suction side is applied on the trailing edge section of the rotor blade, the airflow is deflected from the suction side to the pressure side if the lift modifying device is hinged at the leading edge device portion. If the lift modifying device is hinged at the trailing edge device portion, the airflow is at least partly deflected from the pressure side to the suction side. In other words, there are a plurality of opportunities and design choices where to place the lift modifying device: for instance, it can be attached either at the leading edge device portion or at a trailing edge device portion.

Advantageously, the lift modifying device is made of a non-metallic material, for example rubber or a composite material.

Furthermore, note that the lift modifying device can be implemented in combination with other conventional aerodynamic add-ons, such as vortex generators or serrated trailing edge flaps.

The predetermined loading at which the air channel is opened up can be set by pre-stressing the torsion or friction connection between the lift modifying device and the remaining trailing edge section. The pre-stressing and thus the predetermined loading of the lift modifying device can be chosen differently for different spanwise positions at the rotor blade. Thus a customized lift characteristic of the rotor blade can be achieved.

Embodiments of the invention are also directed towards a method to modify the lift of a rotor blade of a wind turbine. The rotor blade is configured according to one of the embodiments as described above. The method includes a first step at which the air channel opens up—actively or passively—and a second step at which the airflow that is flowing from the leading edge section to the trailing edge section is at least partly deflected by the open air channel. This may result in a modification of the lift of the rotor blade. Note that the first step occurs at a predetermined loading of the trailing edge section. Both steps may occur simultaneously or one after the other.

Furthermore note that specific embodiments and details, which have been described in relation to the rotor blade with the lift modifying device as such, also apply to the method of modifying the lift of the rotor blade.

BRIEF DESCRIPTION

Some of the embodiments will be described in detail, with reference to the following figures, wherein like designations denote like members, wherein.

DETAILED DESCRIPTION

Figure 1:
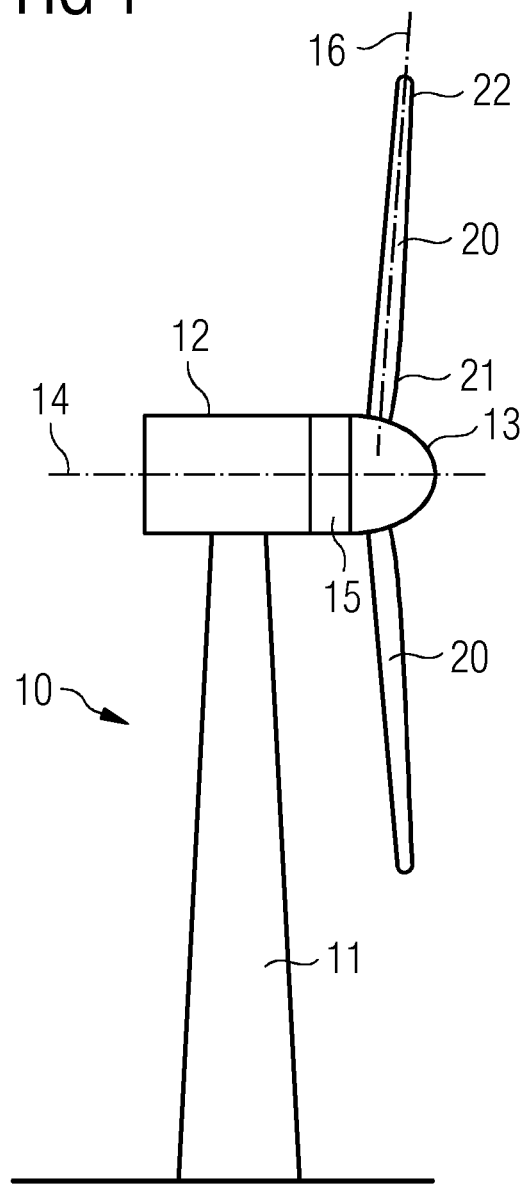
FIG. 1 shows an embodiment of a wind turbine.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with three rotor blades 20 (of which two rotor blades 20 are depicted in FIG. 1). The hub 13 is mounted rotatable with regard to the nacelle 12 by means of a main bearing. The hub 13 is mounted rotatable about a rotor axis of rotation 14.

The wind turbine 10 furthermore comprises a main shaft, which connects the hub 13 with a rotor of a generator 15. The hub 13 is connected directly to the rotor, thus the wind turbine 10 is referred to as a gearless, direct driven wind turbine. As an alternative, the hub 13 may also be connected to the rotor via a gearbox. This type of wind turbine is referred to as a geared wind turbine.

The generator 15 is accommodated within the nacelle 12. It comprises the rotor and a stator. The generator 15 is arranged and prepared for converting the rotational energy from the rotor into electrical energy.

Figure 2:
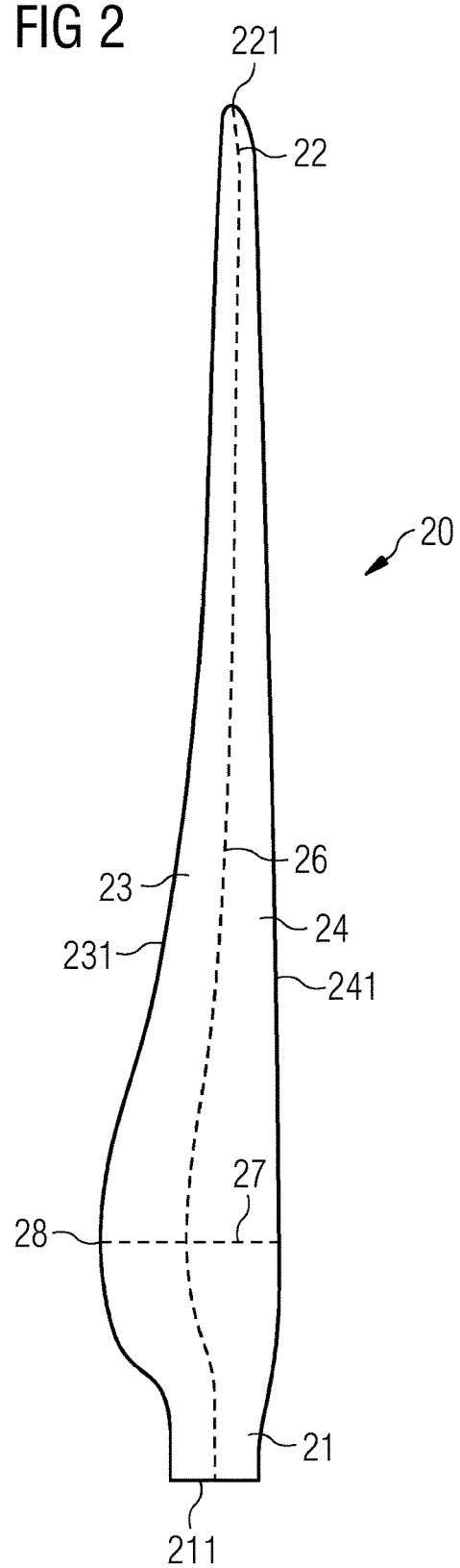
FIG. 2 shows an embodiment of a rotor blade of a wind turbine.

FIG. 2 shows a rotor blade 20 of a wind turbine. The rotor blade 20 comprises a root section 21 with a root 211 and a tip section 22 with a tip 221. The root 211 and the tip 221 are virtually connected by the span 26 which follows the shape of the rotor blade 20. If the rotor blade were a rectangular shaped object, the span 26 would be a straight line. However, as the rotor blade 20 features a varying thickness, the span 26 is slightly curved or bent as well. Note that if the rotor blade 20 was bent itself, then the span 26 would be bent, too.

The rotor blade 20 furthermore comprises a leading edge section 24 with a leading edge 241 and a trailing edge section 23 with a trailing edge 231.

The trailing edge section 23 surrounds the trailing edge 231. Likewise, the leading edge section 24 surrounds the leading edge 241.

At each spanwise position, a chord line 27 which connects the leading edge 241 with the trailing edge 231 can be defined. Note that the chord line 27 is substantially perpendicular to the span 26. The shoulder 28 is defined in the region where the chord line comprises a maximum chord length.

Furthermore, the rotor blade 20 can be divided into an inboard section which comprises the half of the rotor blade 20 adjacent to the root section 21 and an outboard section which comprises the half of the rotor blade 20 which is adjacent to the tip section 22.

Figure 3:
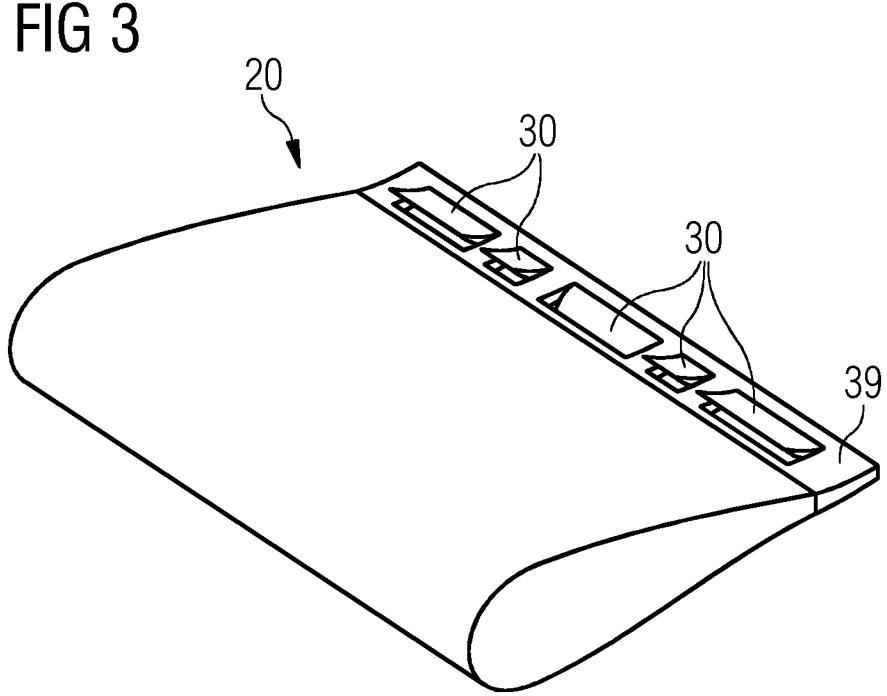
FIG. 3 shows a section of a rotor blade with embodiments of lift modifying devices in a perspective view.

FIG. 3 shows a perspective view of a rotor blade 20 with a plurality of lift modifying devices 30. In particular, a part of the airfoil section of the rotor blade 20 is depicted. The airfoil section comprises a main body and an extension part 39 that is attached to the main body at the trailing edge section of the rotor blade. The extension part 39 comprises a plurality of lift modifying devices 30 which are aligned one next to the other in spanwise direction of the rotor blade. The various lift modifying devices 30 differ from each other with regard to their spanwise extension. They may also differ with regard to the predetermined loading at which they are activated in the sense of opening up the air channel for deflecting the airflow flowing from the leading edge section to the trailing edge section of the rotor blade.

By such a set of lift modifying devices aligned in spanwise direction, customized lift characteristics of the airfoil section of the rotor blade can be provided.

As an alternative, several lift modifying devices may also be positioned in chordwise direction of the rotor blade. Exemplarily, two lift modifying devices which are equal in size may be placed one next to the other in chordwise direction at the extension part 39. This allows for example for activating the first lift modifying device at a first predetermined loading and the second lift modifying device, which is placed at the same spanwise position as the first lift modifying device, at a second predetermined loading.

Figure 4:
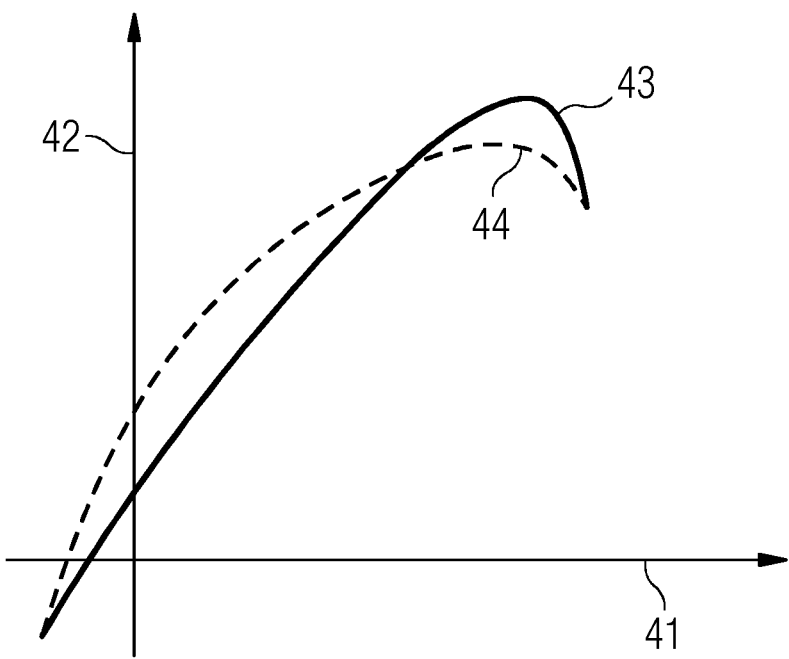
FIG. 4 shows the lift characteristics of a conventional rotor blade at a given spanwise position, compared to the lift characteristics of a rotor blade at a given spanwise position with an examplary lift modifying device.

FIG. 4 shows two graphs of lift characteristics of rotor blades. The vertical coordinate axis represents the lift coefficient 42 and the horizontal coordinate axis represents the angle of attack 41. The graph 43, which is referred to as the first graph, represents an example of a conventional rotor blade. The graph 44, which is referred to as the second graph, represents an example of a rotor blade with a lift modifying device.

It can be seen that for the minimum angle of attack and the maximum angle of attack both graphs 43, 44 coincide. However, in a first section of small angles of attack the lift coefficient of the second graph 44 is enhanced compared to the lift coefficient of the first graph 43. This may be advantageous in terms of energy production of the wind turbine. In a second portion of angles of attack with high angles of attack the lift coefficient of the second graph 44 is reduced compared to the lift coefficient of the first graph 43. This may be a beneficial design as the loading of the rotor blade and the wind turbine as a whole is reduced for higher angles of attack, thus alleviating strain and stress on main components of the wind turbine.

In summary, it can be seen that by implementing lift modifying devices at the rotor blade the lift coefficient versus angle of attack curve can be manipulated in a customized way.

Figure 5:
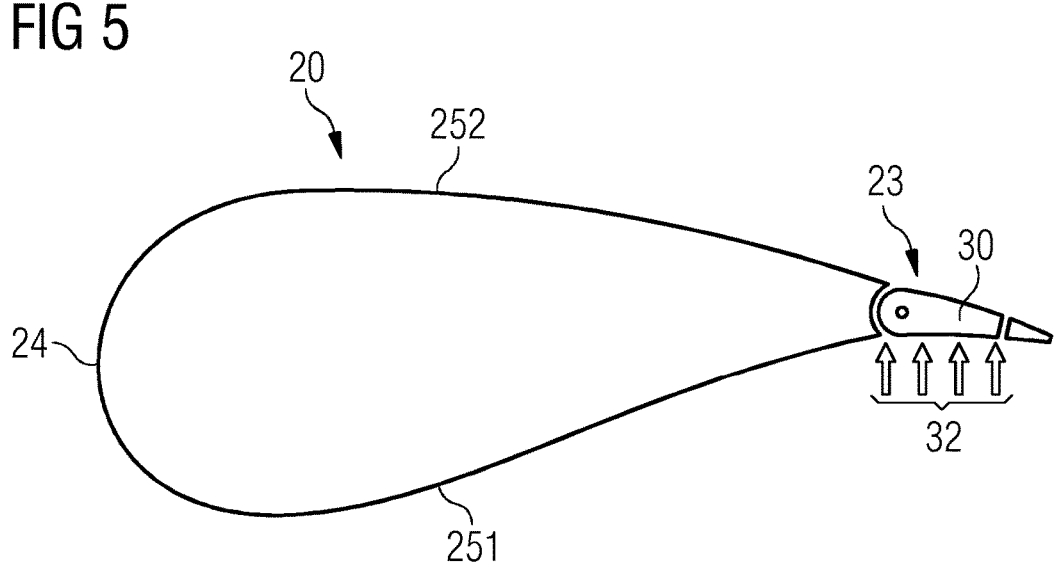
FIG. 5 shows a force acting on an embodiment of the lift modifying device from the pressure side.
Figure 6:
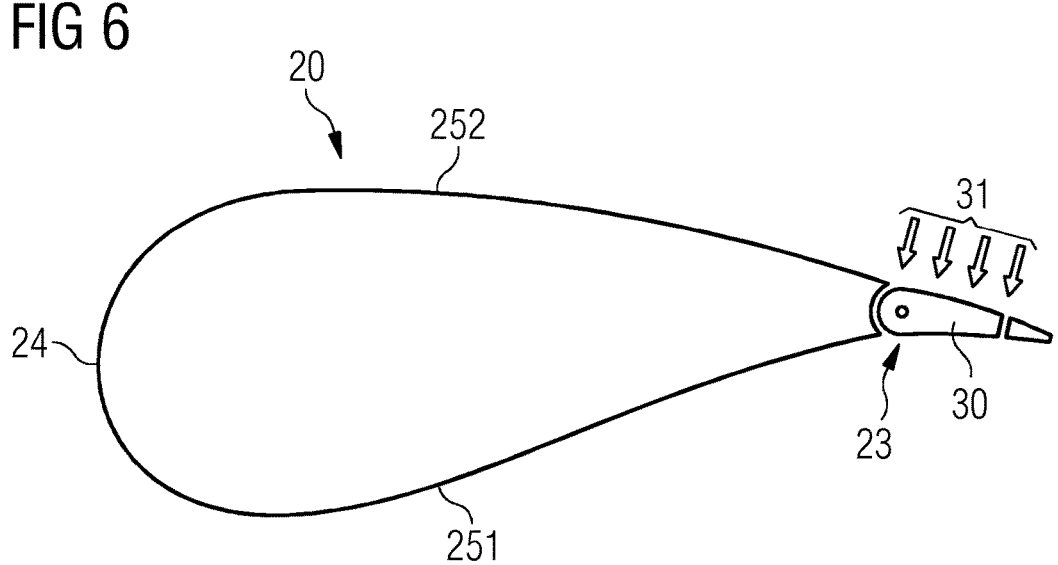
FIG. 6 shows a force acting on an embodiment of the lift modifying device from the suction side.

FIGS. 5 and 6 show the airfoil section of a rotor blade in a cross sectional view. The leading edge section 24, the trailing edge section 23, the suction side 252 and the pressure side 251 can be depicted. The trailing edge section 23 comprises a lift modifying device 30. The lift modifying device 30 is connected to the trailing edge section via a hinge at the leading edge device portion of the lift modifying device 30.

In FIG. 6, a first predetermined loading 31 acts on the trailing edge section 23. The first predetermined loading comprises forces that are acting on the trailing edge section 23. The first predetermined loading 31 comprises the magnitude of the forces and the direction of the forces. As there may be variation of either the magnitude or the direction or both of the first predetermined loading along the chord line, the first predetermined loading 31 has to be understood as a set of vectors which represents the actual forces at various chordwise positions. In FIG. 6, the first predetermined loading can be translated into forces acting from the suction side 252 towards the pressure side 251.

In comparison, FIG. 5 shows the second predetermined loading, which is represented by a set of forces that act from the pressure side 251 towards the suction side 252.

FIGS. 7 to 10 show detailed views of lift modifying devices 30. These lift modifying devices 30 are each connected to the trailing edge section of a rotor blade. As the lift modifying device itself is defined as being part of the trailing edge section, it may also be said that the lift modifying device is connected to the remaining trailing edge section. In this sense, the term remaining trailing edge section refers to the fact that the remaining trailing edge section and the lift modifying device form together the trailing edge section 23.

The lift modifying devices 30 are connected to the trailing edge section via a mechanical hinge at either the leading edge device portion 35 or the trailing edge device portion 36.

The airflow that is flowing from the leading edge section to the trailing edge section of the rotor blade is also depicted in FIGS. 7 to 10.

As FIGS. 7 to 10 show situations where the air channel is open, there occurs a deflection of the airflow, at least a part of the airflow is deflected by the open air channel.

Figure 7:
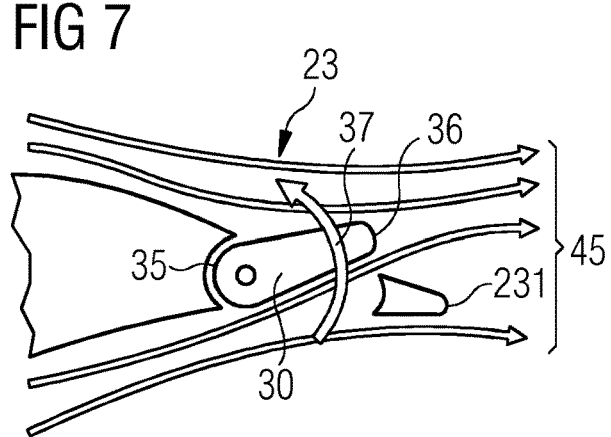
FIG. 7 shows an embodiment of a lift modifying device that is attached to the trailing edge section at the leading edge device portion.

Specifically, FIG. 7 shows a lift modifying device 30 that is hinged at the leading edge device portion 35 and which opens up towards the suction side of the rotor blade. As a consequence, a fraction of the airflow 45 is deflected from the pressure side to the suction side.

Figure 8:
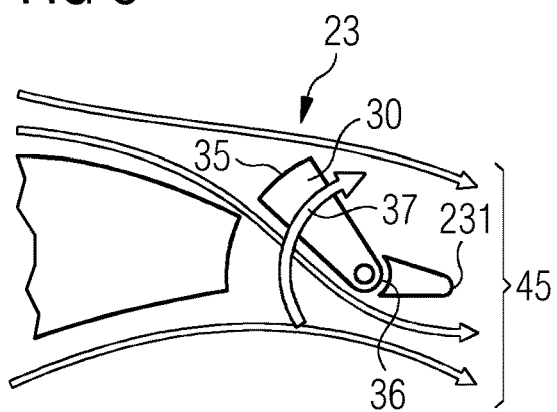
FIG. 8 shows an embodiment of a lift modifying device that is attached to the trailing edge section at the trailing edge section.

FIG. 8 shows a lift modifying device 30 that is hinged at the trailing edge device portion 36 and which opens up towards the suction side of the rotor blade as well. As a consequence airflow on the suction side is partially deflected towards the pressure side by passing through the air channel.

Figure 9:
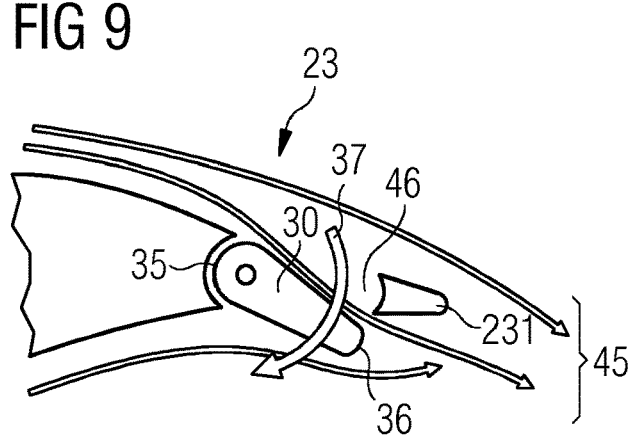
FIG. 9 shows a lift modifying device that is attached to the trailing edge section at the leading edge device portion.

FIG. 9 shows a lift modifying device 30 that is hinged at the leading edge device portion 35 and which opens up towards the pressure side of the rotor blade. As a consequence airflow of the suction side is partially deflected towards the pressure side and passes by the air channel.

Figure 10:
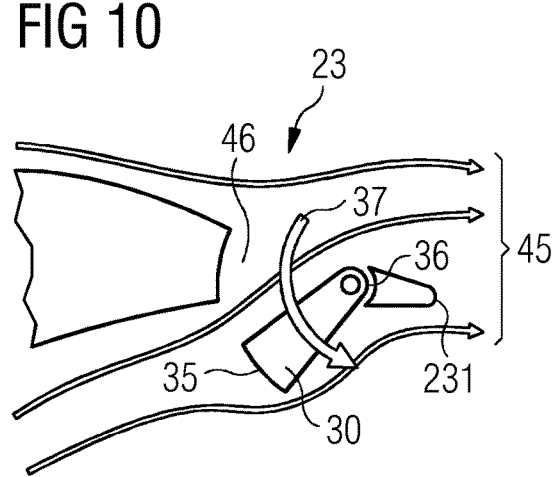
FIG. 10 shows an embodiment of a lift modifying device that is attached to the trailing edge section at the trailing edge device portion.

FIG. 10 shows a lift modifying device 30 that is hinged at the trailing edge device portion 36 and which opens up towards the pressure side of the rotor blade. As a consequence a fraction of the airflow 45 from the pressure side flows towards the suction side via the air channel.

Figure 11:
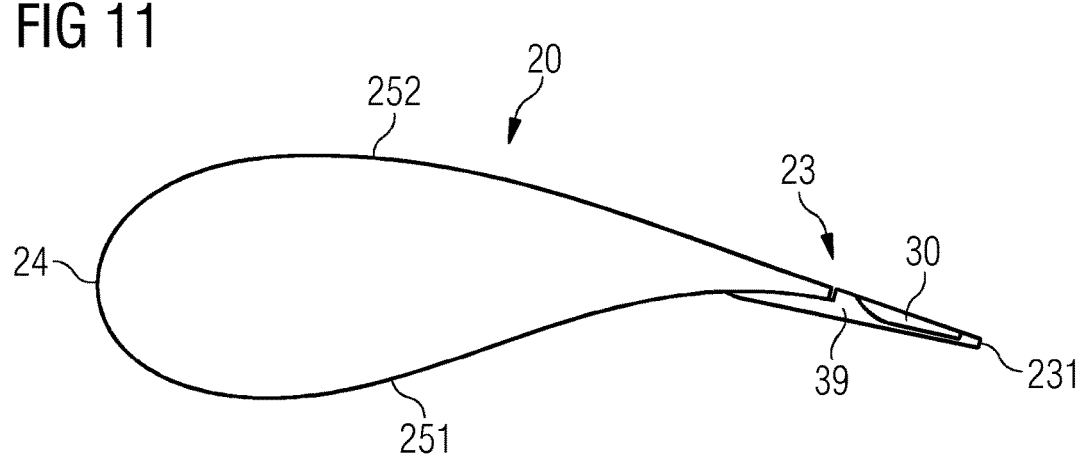
FIG. 11 shows an embodiment of a lift modifying device that is designed as a flexural element.

FIG. 11 shows a cross sectional view of the airfoil section of the rotor blade 20. The leading edge section 24, the trailing edge section 23, the pressure side 251 and the suction side 252 are illustrated. At the trailing edge section 23 a lift modifying device 30 is integrated. The lift modifying device 30 is located upstream of the trailing edge 231 of the rotor blade 20. The lift modifying device 30 is a part of an extension part 39. The extension part 39 is attached to the pressure side 251 of the rotor blade 20.

Figure 12:
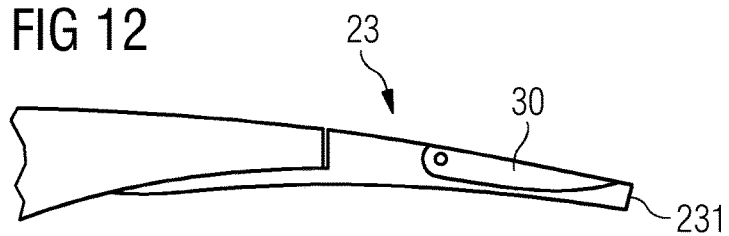
FIG. 12 shows a detailed view of an embodiment of the lift modifying device of FIG. 11.

FIG. 12 shows a detailed view of the trailing edge section 23 of the rotor blade shown in FIG. 11. In this embodiment, the lift modifying device 30 is configured as a flexural element. If a force from the suction side to the pressure side acts on the lift modifying device 30, then the lift modifying device 30 is deflected elastically and performs a flexural movement 38.

Figure 13:
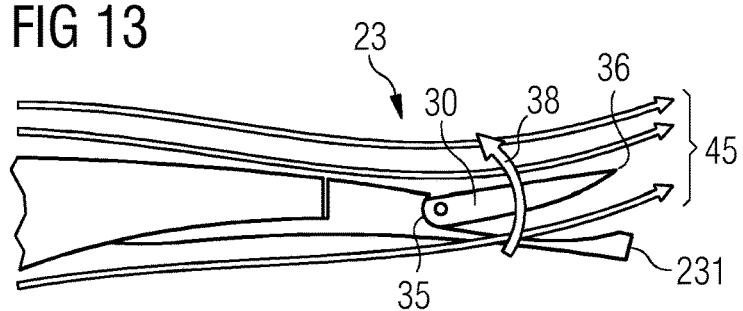
FIG. 13 shows an embodiment of the lift modifying device designed as a flexural element and attached at the leading edge device portion to the trailing edge section.

This can be seen in FIG. 13 showing the scenario that the lift modifying device 30 is attached to the remaining trailing edge section at the leading edge device portion 35. Thus, if the lift modifying device 30 is opened towards the suction side of the rotor blade, the airflow 45 on the pressure side of the rotor blade is deflected partially towards the suction side of the rotor blade.

Figure 14:
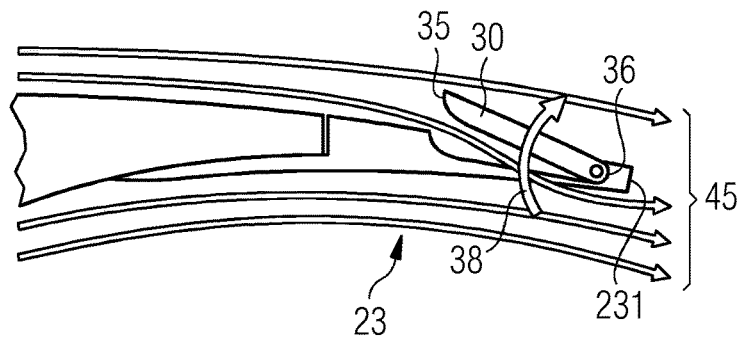
FIG. 14 shows the same embodiment of the lift modifying device as shown in FIG. 13, but attached at its trailing edge device portion to the trailing edge section.

In FIG. 14, a slightly different configuration of the flexural element acting as the lift modifying device 30 can be seen. In this case, the lift modifying device 30 is connected to the remaining trailing edge section at the trailing edge device portion 36. As a consequence, airflow 45 of the suction side is partially deflected towards the pressure side by passing by the open air channel.

Figure 15:
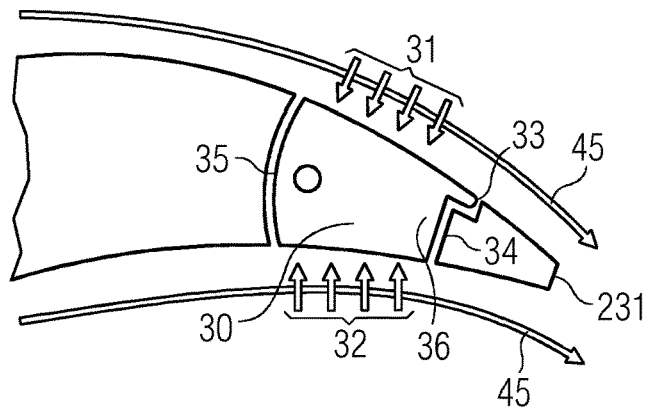
FIG. 15 shows an embodiment of the lift modifying device with a mechanism for selectively blocking the opening up of the air channel.

Finally, FIG. 15 shows a lift modifying device 30 comprising a mechanism to block a movement of the lift modifying device 30 in one specific direction. In the embodiment shown in FIG. 15 the movement of the lift modifying device 30 from the suction side towards the pressure side of the rotor blade is prevented by a special configuration of the rim 33 of the lift modifying device 30 compared to the rim 34 of the air channel. Thus, if a first predetermined loading 31, which basically comprises forces acting from the suction side towards the pressure side of the rotor blade, acts on the lift modifying device 30 the position of the lift modifying device 30 does not change. Thus, the lift characteristics do not change under the first predetermined loading 31. If however, a second predetermined loading 32 acts on the lift modifying device 30 then the lift modifying device 30 would open up an air channel. In this context, the second predetermined loading 32 is to be understood as forces acting from the pressure side towards the suction side of the rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine with a lift modifying device, comprising:
   a pressure side;
   a suction side;
   a leading edge section with a leading edge; and
   a trailing edge section with a trailing edge,
   wherein the lift modifying device is a part of the trailing edge section, and the lift modifying device is configured such that, at a predetermined loading of the trailing edge section when forces due to airflow that is flowing from the leading edge to the trailing edge acting on the trailing edge section exceed a threshold, an air channel opens up a flow path from the pressure side to the suction side and vice versa in the trailing edge section, such that airflow flowing from the leading edge section to the trailing edge section is at least partly deflected by the open air channel, which results in a modification of the lift of the rotor blade;
   wherein the lift modifying device is located upstream of the trailing edge of the trailing edge section of the rotor blade;
   wherein the lift modifying device is a single component that is flush with a surface of the pressure side and a surface of the suction side when in a closed position;
   wherein the trailing edge section comprises an extension part which is separate from a remaining trailing edge section, the extension part being attached to the pressure side of the rotor blade and the remaining trailing edge section, and the lift modifying device being a part of the extension part.

2. The rotor blade according to claim 1, wherein the trailing edge section with the lift modifying device is built as one, single piece.

3. The rotor blade according to claim 1, wherein the rotor blade comprises a plurality of lift modifying devices, which are arranged in a spanwise direction along the trailing edge section, such that the lift of the rotor blade is modified locally with regard to a spanwise position along the rotor blade.

4. The rotor blade according to claim 1, wherein at a first predetermined loading, a force from the suction side is applied on the trailing edge section of the rotor blade, thus opening up the lift modifying device towards the pressure side of the rotor blade.

5. The rotor blade according to claim 1, wherein at a second predetermined loading, a force from the pressure side is applied on the trailing edge section of the rotor blade, thus opening up the lift modifying device towards the suction side of the rotor blade.

6. The rotor blade according claim 1, wherein the lift modifying device comprises a mechanism that prevents the lift modifying device from opening up towards the pressure side, thus only allowing the lift modifying device to open up towards the suction side, or that prevents the lift modifying device from opening up towards the suction side, thus only allowing that the lift modifying device open up towards the pressure side.

7. The rotor blade according to claim 6, wherein the mechanism includes a rim of the lift modifying device that at least partly overlaps with a rim of the air channel in a closed state of the air channel.

8. The rotor blade according to claim 1, wherein the lift modifying device comprises a leading edge device portion facing towards the leading edge section of the rotor blade and a trailing edge device portion being opposite to the leading edge device portion, the lift modifying device opening up at either the leading edge device portion or the trailing edge device portion.

9. The rotor blade according to claim 1, wherein the lift modifying device is attached to the remaining trailing edge section by a mechanical hinge, which comprises a torsional spring, thus the lift modifying device is arranged and prepared for passively opening up the air channel at a predetermined loading of the trailing edge section.

10. The rotor blade according to claim 1, wherein the lift modifying device is firmly attached to the trailing edge section, and the lift modifying device is flexible such that it elastically deflects for passively opening up the air channel at a predetermined loading of the trailing edge section.

11. The rotor blade according to claim 1, wherein the air channel is opened up passively.

12. A method comprising: modifying a lift of the rotor blade of the wind turbine, wherein the rotor blade is configured according to claim 1, and at the predetermined loading of the trailing edge section, the air channel opens up, and the airflow flowing from the leading edge section to the trailing edge section is at least partly deflected by the open air channel, which results in a modification of the lift of the rotor blade.

* * * * *